Patented July 4, 1944

2,352,874

UNITED STATES PATENT OFFICE 2,352,874

CARDIOMETRIC APPARATUS

Bradlee W. Williams and Homer S. Williams, Chicago, Ill., assignors to Tech Equipment Company, Chicago, Ill.

Application July 14, 1941, Serial No. 402,359

29 Claims. (Cl. 128—2.05)

This invention pertains to the measurement and detection of pressures and pulsations in fluid pressure systems, and more particularly in the arterio-circulatory system of the human body.

A principal object of the invention is the provision of automatic apparatus, adapted to be coin-controlled, for automatically measuring the blood pressure and pulse rate.

Another object is to provide means for ascertaining both the diastolic and systolic blood pressure and manifesting the same independently.

A further object is to provide means employing a single tourniquet capable of applying an occluding pressure to an artery, and also of coacting with pressure-sensitive switch means for controlling the occluding or applied pressure in a manner to actuate indicating means to express the systolic and diastolic blood pressures.

A further object is the provision of mechanism controlled by the aforesaid pressure-sensitive switch means for actuating an indicator to manifest the number of true pulses occuring in a given testing period.

Yet another object is the provision of automatic control means and circuit connections for effecting the pressure ascertaining and pulse-rate ascertaining operations in a certain order, automatically.

Still further objects are to provide a simple mechanism of the class described especially suited, by virtue of its structural and operating simplicity and organization, for automatic operation under control of a coin or token, so that it may be easily operated by the general public; to provide a single wrist tourniquet obviating the necessity for removal of the coat and, in most instances, the sleeve, whereby certain artificial pressures may be applied to the brachial artery in the region of the wrist.

Further objects are to provide means for varying the applied pressure from time to time in different manners, particularly from sub-diastolic levels upwards, in ascertaining systolic and diastolic arterial tensions; to increase the applied pressure and thereby detect and manifest arterial pressures at the diastolic level; to increase the applied pressure to a value sufficient to occlude blood flow in said artery; to reduce the occluding pressure in timed and measured amounts; to test for a certain number and sequence of true pulses of one or both kinds in a timed interval to ascertain if there is a true resumption of blood flow as the pressure is reduced; to arrest such reduction when such flow is positively resumed and manifest the applied pressure then existing as a measure of the systolic blood pressure; to count the pulses by means responsive to pressure variations resulting from arterial pulses in the same tourniquet which is employed in applying the occluding pressure and to prevent counting of false variations in the nature of pulses resulting from various kinds of involuntary movements sensed by the tourniquet.

Additional objects are to provide pulse rate indicating means and timing means associated therewith utilized for control in both the pressure and pulse rate ascertaining phases of the cycle of operation of the apparatus; to provide impositive drive means and justifying means for correlating certain movements of the pulse rate indicating means and said timing means and to provide simplified control means for a pulse counting mechanism.

Other novel aspects and features of the invention reside in various details of the integration, correlation, function, and structure of the parts and instrumentalities comprising the combination of the preferred embodiment of the device described hereinafter in view of the annexed drawings in which.

*Introductory statement of operation*

To use the apparatus, the patron inserts his wrist in a tourniquet device and tightens a strap holding the wrist firmly in place. Usually the patron is seated before the apparatus, and after placing the wrist as aforesaid, he deposits a coin which starts the machine through its cycle of operation.

The tourniquet becomes inflated by air or other fluid pressure until pulses at the diastolic level are sensed by a detector device, whereupon testing mechanism automatically tests for a certain number of true pulses which, if detected, causes a diastolic manometer or indicator to manifest the pressure at which the pulses were detected. This pressure corresponds to the arterial diastolic pressure.

Having ascertained the diastolic pressure, the machine automatically increases the pressure in the tourniquet to a high value to stop the blood flow in the artery under test. Thereafter this elevated pressure is reduced step by step until pulses are again sensed by the detecting means, and test is again automatically made to ascertain if the pulses are true arterial pulses; if so, the pressure reduction stops automatically; if the requisite number and sequence of true pulses is not detected, the pressure reduction continues until such pulses are detected, whereupon the pressure then existing in the tourniquet is manifested by another indicator or manometer as the systolic blood pressure.

Having determined the diastolic and systolic pressures as aforesaid, the machine then automatically counts the number of true pulses in a certain period and manifests this count as the pulse rate, whereupon the machine shuts off preparatory to the next operation.

*Means for ascertaining diastolic pressure*

Figure 2:
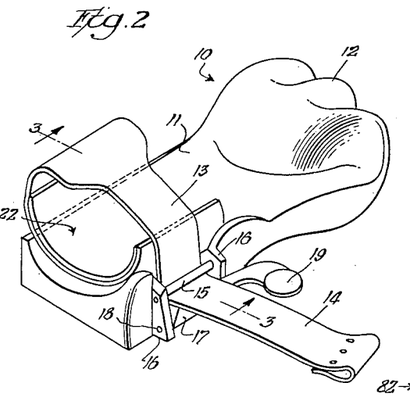
Fig. 2 is a perspective detail of the arm rest and tourniquet.

In Fig. 2 there is shown an arm rest 10 including a trough portion 11 and a complementary hand-form 12 to receive the hand when the wrist is disposed in the trough. Also fixed in the trough is a wrist strap 13 with a tongue 14 which extends between jaw means, including a roller 15, seated in opposite flanges 16 cast with the rest, and a rocking jaw 17 pivoted as at 18a in the flanges beneath the roller. A spring 18 normally urges the movable jaw in an anticlockwise direction to wedge the tongue against the roller. The movable jaw has a thumb-piece 19 by which it can be rocked clockwise to free the strap or tongue.

Secured in the bottom of the trough with the strap is in inflatable cushion or bag 20 (Fig. 3) with a tube 21 passing through the bottom of the trough for connection with a fluid pressure system presently to be described. A silk, or other suitable light-weight fabric, shield 22, fixed to the strap as at 23, protects and covers the cushion 20.

Figure 3:
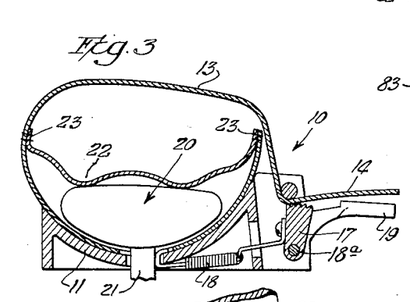
Fig. 3 is a cross section along lines 3—3 of Fig 2.

The foregoing rest including the strap and cushion constitutes a form of tourniquet adapted to be mounted on a suitable table portion (not illustrated) of the machine so that the subject or patron under test may insert his wrist in the strap and rest, tighten the tongue 14, and by depositing a coin in the machine, for example, set the apparatus into operation.

Figure 1:
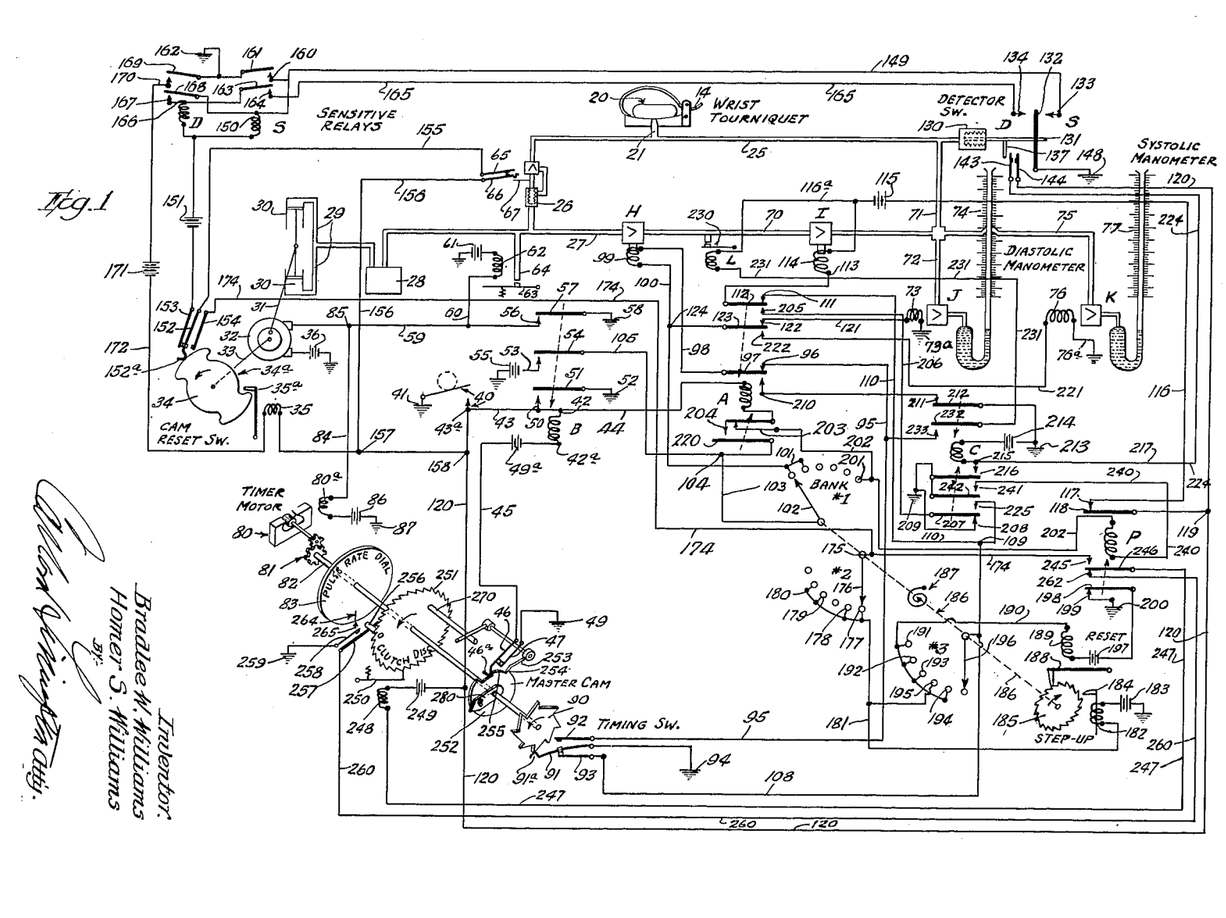
Fig. 1 is a pictorial schematic of the entire organization including various mechanical and electrical instrumentalities and connections therein.

Referring to Fig. 1, it will be observed that the tourniquet cushion or bag 20 is connected through its tube 21 to a branch pressure conduit 25 which connects through a 45 mm. bellows valve 26 to a main pressure conduit 27 leading into a fluid pressure receiver or reservoir 28 connecting through pipes 29 to a pair of tandem pumps 30 driven by a crank connection 31 from a pump motor 32.

When the patron deposits his coin in the coin receiver (not illustrated because conventional), a coin or starting switch 40 is momentarily closed connecting ground 41 to one terminal 42 of a relay B via conductor 43 and also via conductor 44 to one terminal of a relay A. The remaining terminal 42a of relay B connects to power 49a circuit for which is completed via conductor 45 leading through normally closed master cam switch contacts 46 and 47 to ground 49. The foregoing circuit thus momentarily established by operation of the coin switch causes relay B to pull up or become operated, and to close a holding circuit for itself through its contacts 50 and 51 to ground 52. This holding circuit will be broken only by opening of master cam switch contacts 46 and 47 at a certain stage in the operation of the machine.

As an immediate incident to the operation of relay B upon deposit of a coin as aforesaid, its contacts 56 and 57 close to connect ground 58 via conductor 59 to pump motor 32 and energize the same from its grounded battery 36.

Also energized at this time from conductor 59 via conductor 60 from battery or power source 61 is the coil 62 of a normally open electro-magnetic escape valve means 63, which closes against outlet 64 so that air pressure may be built up in the system, by pumps 30, particularly in reservoir 28 and main branch 27.

The air pressure built up as aforesaid starts from a sub-diastolic level or value and is exerted through bellows valve 26 upon branch 25 and hence inflates the tourniquet cushion 20 against the patron's wrist. As soon as the pressure reaches the relatively low value of about 45 millimeters of mercury, valve 26 closes by back pressure and closes safety switch contacts 65—66 by movement of bellows-moved arm or member 67. If the patron removes his wrist from the tourniquet before completion of the test, the drop in pressure in bag 20 causes safety switch 65—66 to open for purposes later to appear.

The apparatus will now proceed to increase the pressure applied through tourniquet 20 in steps until diastolic pulsations are detected by a detector switch sensitive to pressure variations in branch 25.

This adjustment or variation upward of the pressure is effected through the agency of a pair of normally closed measuring valves H and I situated in branch 27, and enclosing in their path a short section 70 of measuring conduit which leads through valve I and a branch conduit 71 into the tourniquet branch 25, on the one hand, and through a conduit connection and a normally closed electro-magnetic manometer valve J into the well of a mercury manometer 74 designated as the "Diastolic manometer," on the other.

A further conduit branch 75 leads from the main pressure line through valve I and a second normally closed electromagnetic manometer valve K into the well of a second mercury manometer 77 designated the "Systolic manometer."

By alternately opening and closing the measuring valves H and I, it will be apparent that the pressure in the tourniquet branch can be gradually increased for the purpose of approaching the low or diastolic pressure which exists in each diastole of the cardiac cycle, and since the diastolic pressure phase is manifested as a pressure change or pulsation in the artery, a time will arrive when the increasing applied pressure is sufficiently elevated to cause the tourniquet bag to yield and expand to the diastolic pressure variations, causing corresponding pressure variations in the bag itself and hence the pressure branch 25 to which it is connected.

Means for alternately opening and closing the measuring valves H and I includes a measuring switch which forms part of a combination pulse rate indicator means and timing unit including a timing motor 80 driving through slow clockwork gears 81 a shaft 82 upon which floats freely a pulse rate indicating dial 83. Motor 80 begins to run as soon as relay B pulls up upon deposit of a coin, owing to connection of ground to the motor coil or winding 80a via conductor 84 connecting at 85 to a conductor 59 which is grounded by relay B. Power source 86 grounded at 87 drives motor 80 through the aforesaid connections until relay B finally drops out.

Mounted to rotate constantly with timer shaft 82 is a star cam 90 engaged by the offset 91a of a spring contact 91 of a timing switch including contacts 92 and 93 alternately engaged by contact 91 as the star cam rotates and to which central contact 91 therefore alternately connects ground 94.

The timing switch contacts 91—92 complete an operating circuit from ground 94 via conductor 95, normally closed contacts 96—97 on a relay A and conductor 98 to one side of the coil 99 for valve H, the other side of which coil completes circuit to battery 55 through conductor 100 and the first of two looped contacts 101 on a commutator switch bank #1, and thence through wiper 102 and conductor 103 to juncture 104 with a conductor 105 leading to battery 55 through contacts 53—54 on relay B. Thus, each time contacts 91—92 open and close as the star cam rotates, the measuring valve H will open and close via the aforesaid operating circuit, to admit air to the measuring chamber or conduit 70.

Valve I is similarly operated in alternation with valve H by connection of ground 94 through contacts 91—93, conductor 106 to junction 109 with conductor 110 and thence via normally closed contacts 111—112 on relay A to terminal 113 on the coil 114 of valve I. The remaining terminal of this valve coil connects to battery 115 which completes its ground circuit via conductor 116 and through normally closed contacts 117—118 on a relay P to juncture 119 with a common ground wire 120 which finally connects at juncture 43a with ground wire 43 on the holding circuit to ground 52 for relay B.

Thus coil 114 for valve I is energized in alternation with coil 99 for valve H, and these valves open and close separately admitting a succession of small volumes of compressed air to tourniquet branch 25.

The pressure existing in the tourniquet system or branch 25 is indicated by the diastolic manometer 74 because its valve J has its coil 73 energized from ground 73a to the coil and thence through conductor 121, normally closed contacts 122—123 on relay A, to juncture 124 with conductor 100, which, as heretofore described, leads to battery 55 (relay A) via contacts 101 and wiper 102 on bank #1 of the commutator switch, the circuit thus described effecting an opening of valve J so long as wiper 102 remains on the first two contacts 101 of bank #1.

As soon as the tourniquet pressure approaches the diastolic blood pressure, a sensitive pressure-responsive device or bellows 130 on the detector switch will move its plunger or rod 131 back and forth in correspondence to such pressure variations, and will carry with it a contact 132 in alternate engagement with systolic contact 133 and diastolic contact 134.

Figure 6:
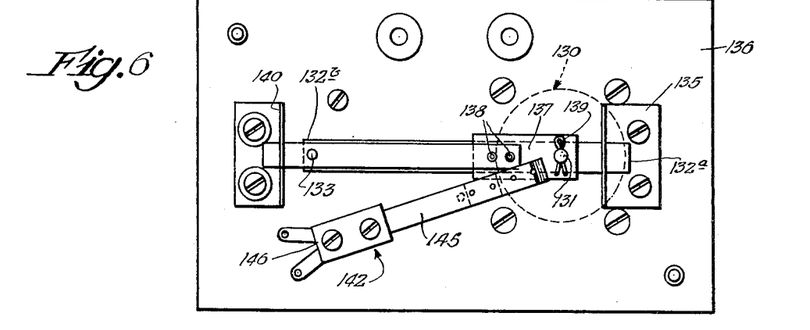
Fig. 6 is a front elevation of the detector switch.
Figure 7:
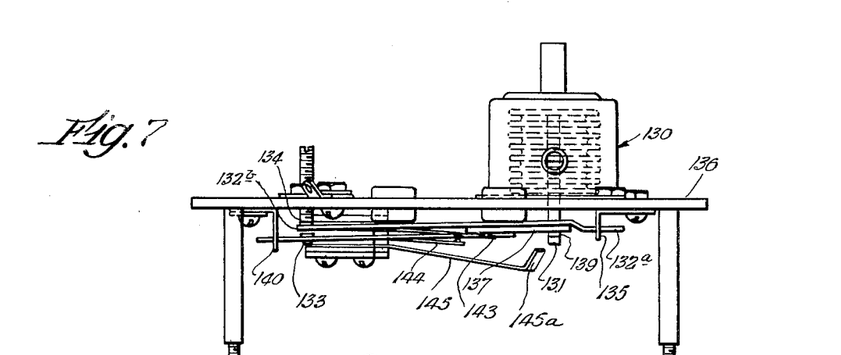
Fig. 7 is a top view of the switch of Fig. 6.
Figure 8:
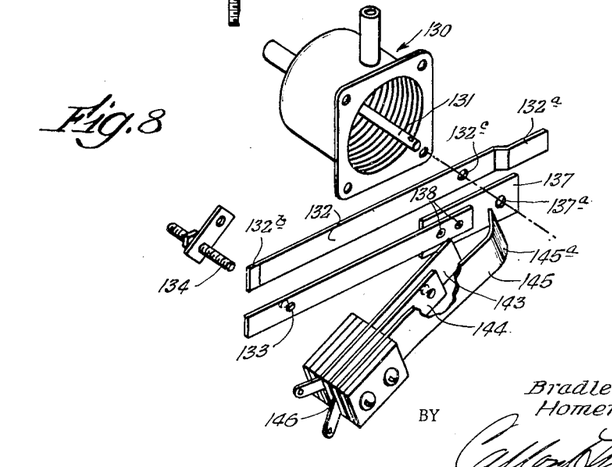
Fig. 8 is an exploded assembly view of the working parts of the switch of Figs. 6 and 7.

The detector switch is shown in detail in Figs. 6 to 8, wherein one end 132a of the movable contact is freely rested in a bracket 135 on a base 136, while the opposite end 132b of the contact 132 is disposed to move back and forth between contacts 133 and 134 under urgence by rod 131, which passes freely through a hole 132c in contact strip 132 close to the end 132a, which latter end is fulcrumed on bracket 135 with sufficient freedom so that the strip 132 may rest by gravity on rod 131 to be carried back and forth by the latter responsive to pressure variations in bellows 130, which cause relatively slight back and forth movements of the rod.

When the tourniquet is first inflated, and when the pressure therein is subsequently increased in order to occlude blood flow, rod 131 is displaced outwardly (to the right in Figs. 1 and 8) a very appreciable distance which is much greater than the limiting distance between contacts 133 and 134; but owing to the impositive or gravity driving connection between rod 131 and contact 132 by having contact 132 rest loosely thereon at hole 132c, the rod 131 is free to project outwardly this relatively great amount, yet upon subsequent minute pulsatory movements of the rod 131 corresponding to arterial pulses, contact 132 will nevertheless be carried back and forth into and out of engagement with contacts 133 and 134. This arrangement permits one form of self-adjustment of the detector switch to various pressure conditions.

A further self-adjusting feature resides in having the systolic contact 133 also loosely mounted at one end by means of an insulating plate 137 riveted thereto at 138 and provided with a hole 137a through which bellows rod 131 passes, the plate resting by gravity on the rod and being secured against dislodgment by a cotter pin 139 in rod 131.

The opposite (left-hand) end of contact 133 rests freely in a bracket 140, which limits the displacements of the contact 133 to a considerably lesser range than that of contact 132. Moreover, the situation of hole 137a remote from bracket 140, which constitutes a fulcrum for contact 133, makes the lever a long one with correspondingly slight displacements upon slight movements of bellows rod 131.

As a result, the contact 133 tends to move not at all as a practical matter, compared with the movements of contact 132 in response to arterial pressure variations. Yet the bellows rod is free to move abruptly into various positions of adjustment at all times. Moreover, the greater the displacements of the bellows rod 131 responsive to arterial pulses, the greater will be the relative displacement of contact 133 with respect to contact 132, but since the ratio of relative displacement of both contacts 132—133 is constant, and is greater or less with respect to the stationary contact 134, depending upon whether or not the pulses are strong or weak, the amplitude of contact displacement is self-adjusting for both weak and strong pulses. This is very important because the actual contact displacement responsive to arterial pulses is only a matter of two or three thousandths of an inch on the average. Contact 134 is adjustable.

A further feature of the detector switch is the provision on base 136 of a pressure switch 142, consisting of a spring contact strip 143 movable back and forth from normally open circuit condition to closed circuit contact with a companion contact strip 144. The free end of contact 143 is positioned to be engaged by plate 137 on contact 133, so that as the latter is moved outwardly under relatively high-pressure displacements of the bellows, "high-pressure" switch contact 143 is closed against contact 144.

A stop spring strip 145 has an angled end 145a also disposed to be engaged by plate 137 to limit the outward movement of the contact 133. Contact strips 143, 144 and stop strip 145 are all mounted at one (left) end between insulating wafers 146 on base 136 in the manner of the usual switch stack assembly.

*Pulse verifying means*

Referring again to Fig. 1, it will be seen that detector or bellows switch contact 132 is grounded at 148. Each time contact 132 engages contact 133, circuit is completed via conductor 149 to terminal 150 of a sensitive "systolic" relay S, whose other terminal is connected in common with another sensitive "diastolic" relay D to one side of a power source or battery 151, from which circuit to ground is completed via normally closed contacts 152—153 of a cam reset switch. Contact 152 connects via conductor 155 and contacts 65 and 66 on the low pressure or 45 mm. bellows switch to conductor 156 which connects at 157 and 158 to a ground wire 120 joining at 43a to ground 52 set up by relay B. Thus, systolic relay S pulls up, and moreover immediately locks its own holding circuit via its contacts 160—161 to ground 162.

When systolic relay S pulls up as aforesaid it sets up an operating circuit for the diastolic relay D via contacts 163—164 and conductor 165 to detector contact 134 and one terminal of coil 166 of the sensitive diastolic relay D, the other terminal of which connects with battery 151 for energization through the normally closed reset cam switch ground circuit 152—153—52 heretofore described; therefore, as soon as a decreasing-pressure pulse in the tourniquet causes detector switch contact 132 to move back and connect ground to contact 134, circuit is completed to energize diastolic relay D, which locks its own holding circuit through its contacts 167—168 to ground 162 via systolic contacts 160—161.

As an incident to the aforesaid energization of diastolic relay D, ground 162 is connected through contacts 169—170 to power or battery 171 for which circuit is completed through the release coil 35 of the reset cam switch to ground wire 120 at 158, so that coil 35 is energized and withdraws a cam holding pawl 35a from cam 34, which cam has a frictional or other suitable slip-clutch driving connection with the constantly rotating shaft 33 on the pump motor. Such a clutch is not seen in the illustration but will be explained hereinafter in view of Figs. 4 and 5.

As soon as holding pawl 35a is withdrawn as aforesaid, cam 34 is free to rotate and present one of the notched or relieved portions 34a on the rim thereof in position so that an offset 152a on spring 152, which rides on the rim of cam 34 as shown in Fig. 1, may press into the notch, thus separating contacts 152—153 and breaking the common power connection from battery 151 for both the systolic and diastolic relays, which therefore become deenergized and released.

Such movement of cam switch contact 152 also causes it to close circuit with a contact 154 via conductor 174 to connection 175 with a wiping contact 176 on bank #2 of the commutator switch for testing purposes, this circuit connecting ground through wiper 176 and the first contact 177 on bank #2, via conductor 181 to one terminal of a step-up coil 182 connected to grounded battery 183 and thereby energized to actuate a stepping pawl 184 and cause a stepping ratchet 185 to step once, whereby commutator switch shaft 186 is rotatively stepped to move all wipers to second position (clockwise in Fig. 1).

A return spring 187 normally tends to restore shaft 186 with its wipers to first position, but such restoration is prevented by a releasable holding pawl 188 adapted to be released by a reset coil 189.

It will thus appear that the sensing or detecting of the first complete diastolic and systolic pulsation at the diastolic pressure level by the tourniquet and associated detector switch, will cause the commutator switch to step to second position; and this action constitutes part of a testing operation, which for completion, requires a plurality of such pulses in a certain order and timed interval.

Reset cam 34 may make only a half revolution before it is again stopped by its pawl 35a, with the result that a power circuit is again set up by contact 152—153 for further operation of the sensitive systolic and diastolic relays by the detector switch.

The next complete arterial pulsation to actuate the detector switch as aforesaid, will cause the commutator switch to make another step, carrying wiper 176 to third position on a dead contact in bank #2; moreover, wiper 102 in bank #1 leaves the second contact 101 and lodges upon a dead contact at third position, thus breaking the circuit to conductor 105 for the respective solenoids of measuring valve H and manometer valve J, so that the latter will hold its pressure reading for the time being, pending further testing operations.

Meanwhile, the star cam 90 is rotating at a rate which will provide an interval sufficiently long for at least two pulses to occur between successive operations by the star cam of timing switch contacts 91—92—93.

After the commutator switch wipers are disposed in third position by the first two detected pulses, control of the step-up coil 182 shifts from the sensitive relays S and D to the timing switch via conductor 181 from the step-up coil, third contact 195 and wiper 196, bank #3, conductor 108 and contacts 91—93 on the timing switch to ground 94. Hence, while the commutator switch rests at third position, a third step will be taken thereby in the time during which at least one more or the third pulsation would normally occur (time being afforded preferably for two pulses), and during which time the closure of timing switch contacts 92—93 causes step-up coil 182 to be energized to carry the wiper contacts to fourth position.

At the fourth position of the commutator switch, wiper 196, bank #3, is on contact 193 which is looped to conductor 190 leading to the reset coil 189, thus connecting the latter for energization from battery 197 (grounded through normal contacts 198—199 on relay P to ground 200) should the timing switch be able to close its contacts 91—93 before the commutator switch can make another step to break the aforesaid resetting circuit.

If no further arterial pulse is detected during the testing interval in which the commutator switch rests in fourth position, reset coil 189 will be energized by the timing switch to withdraw the holding pawl 188 and permit spring 187 to rotate commutator switch shaft 186 to initial or first position, whereupon operation of measuring valves H and I will be resumed, and the test for a series of pulses will be repeated until the commutator takes five steps under alternate control of the sensitive relays S and D and the timing switch.

Assuming that the commutator switch has taken three steps so as to lodge wiper 176 on fourth contact 179, bank #2, the next complete pulse would cause reset cam switch contacts 152—154 to close and actuate the step-up coil, which would advance wiper 176 to contact 180; then another complete pulse would cause the commutator switch to advance the wipers again, lodging wiper 102 on the last contact 201, bank #1, connecting battery 55 via conductor 202 and normal contacts 203—204 on relay A to energize the coil of the latter, and the test for systolic pressure goes forward.

*Means for ascertaining systolic pressure*

Energization of relay A cuts off the coil of valve I from the timing switch by breaking contacts 111—112, but connects this coil, 114, via make contacts 112—205, conductor 206 through normal contacts 207—208 on relay C, to ground 209, causing valve I to remain open.

Likewise, the coil of valve H has its intermittent operating circuit from the timing switch broken at contacts 96—97 of relay A; but contact 97 now makes with contact 210, which provides an operating ground 213 through normal contacts 211—212 on said relay C, as soon as the commutator switch is reset, as it is presently by operation of the timer switch.

Thus, movement of the commutator switch into sixth and last position stops the intermittent operation of measuring valve H and I and causes both valves to remain open, admitting full pressure from branch 70 into the "systolic" branch 75, upon return, as aforesaid, of the commutator switch to first position.

As another incident to the energization of relay A, the latter makes its own holding circuit through make-before-break contacts 204—220 leading directly to battery 55 instead of through last contact 201 on bank #1, by means of which relay A is initially energized through contacts 203—204, until the latter are separated by action of contact 220 in making with contact 204.

It may be observed here that relay C is operated in conjunction with the test for systolic pressure, and is principally instrumental in changing connections to the commutator switch for the later operation of relay P. Relay P is operated in conjunction with the test for the pulse rate, following completion of the systolic pressure test.

Still another incident to energization of relay A is the energization of the coil 76 of systolic manometer valve K from grounded battery 76a via conductor 221, and contacts 123, 222 of relay A to juncture with 124, thence via contacts 101, 102 on bank #1, conductor 103, junction 104 and conductor 105 through 50, 51 to battery 55, thus exposing the mercury column in systolic manometer 77 to the air pressure in branch 75, which pressure now rises to its maximum predetermined value of approximately 200 mm. Hg, and is sufficient to occlude the blood flow in the artery leading past the portion of the wrist held in the tourniquet, for in the majority of persons the arterial tension does not exceed this value. Higher occluding pressures could be easily provided, but would prolong the testing period merely for the sake of reading occasional pressures above 200 mm.

The rise in pressure in the system is immediately communicated to the tourniquet branch via connection 71, and has the effect of expanding the detector bellows 130, the detector switch readjusting itself in the manner hereinbefore described, and causing bellows rod 131 to carry plate 137 against high-pressure contact 143 to close the same against contact 144 as the pressure reaches its maximum occluding value.

This close of high-pressure switch contacts 143, 144 connects the common ground conductor 120 (which is connected via 158—43 to ground 52 through contacts 50—51 while relay B is energized) to conductor 224 and thence to one terminal of the coil of relay C, whose other terminal connects with battery 214 grounded at 213, so that relay C is energized and locks its own holding circuit via its contacts 215—216 to the ground 209.

Energization of relay C causes closure of both measuring valves H and I by breaking the respective holding circuits of their corresponding operating solenoids at contacts 211—212 and 207—208 on relay C, but valve I at once begins to open again intermittently because its coil 114 is energized via conductor 116a from battery 115 through contacts 112—205 on relay A, conductor 206, contacts 207—255 on relay C to junction 109, thence via conductor 108 through timer switch contacts 91—93 to ground 94; so that intermittent closure of the timer contacts 91—93 by the star cam causes similarly timed opening and closing of valve I.

In order to decrease the applied or occluding pressure step by step, a bleeder or escape valve L in main pressure branch 70 has a valve means 230 normally closed, but adapted to be opened by the coil L, which has one terminal connected via conductor 116a to battery 115, and its other terminal connected via conductor 231 and contacts 232—233 on relay C to conductor 95 which connects through intermittent closings of timing switch contacts 91—92 to ground to energize coil L and open the bleeder valve in alternation with valve I. Thus, the pressure in the tourniquet is dropped by admitting to the conduit section 70 its capacity of air through valve I, closing valve I and opening the bleeder valve, and so on, until the blood flow is resumed in the artery under test, and systolic and diastolic pulsations again actuate the detector bellows 130 and associated detector switch parts to cause energization of the systolic sensitive relay S, and then the diastolic sensitive relay D, in the manner heretofore described in explaining the operation of these relays in testing for pulses at the diastolic level.

In order to test for true pulses, as in the case of ascertaining the diastolic blood pressure, the commutator switch is restored to starting or first position by contacts 207—225 on relay C as a result of the energization of relay A and the described connection of ground 94 through timer switch contacts 91—93, conductor 108, wiper 196 to last contact 191 on bank #3 to reset coil 189, which is thus energized from battery or power source 197 to withdraw holding pawl 188 so that spring 187 can rotate the switch shaft and restore the wipers to the first position.

The first two successive and complete pulses (i. e. systolic pulsation followed by the attendant diastolic pulsation) cause the commutator switch to step twice under control of the reset cam switch contacts 152—153, as heretofore described, thus carrying wiper 196 to contact 195, bank #3, and shifting step-up control to the timing switch via conductor 108 for the next step, which again restores step-up control to the reset cam switch and the sensitive relays for succeeding advances occasioned by a succession of true pulses.

The commutator switch will reset, if the requisite number of pulses is not registered in the time provided; but upon advance of the commutator switch to final testing position to lodge wiper 102 on the last contact 201 of bank #1, a relay P is energized to initiate the pulse rate test, this being effected by connection of power from battery 55 via wiper 102 and conductor 202 to the coil of relay P and thence from the coil via conductor 240 and contacts 241—242 on relay C to the ground 209. Systolic manometer valve K closes as soon as wiper 102 leaves second position, bank #1.

Pulse count means

As a result of energization of relay P, the ground circuit from juncture 119 via normal contacts 117—118, conductor 116 to battery 115, for valves I and L, is broken; so that there will be no further change in pressure in the closed system, which includes the tourniquet, until the machine shuts off.

However, arterial pulses will continue to actuate the detector switch and sensitive relays S and D with consequent actuations of the reset cam switch means 34—35—35a and contacts 152—153—154 upon each complete pulsation.

Figure 4:
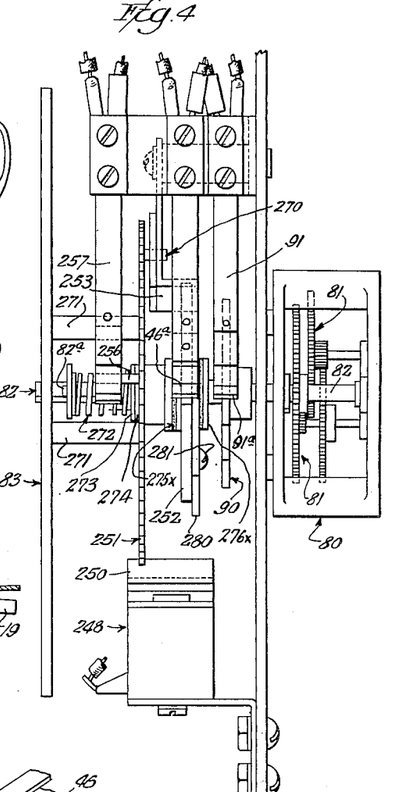
Fig. 4 is a vertical section through the combination pulse rate indicating and timer unit.
Figure 5:
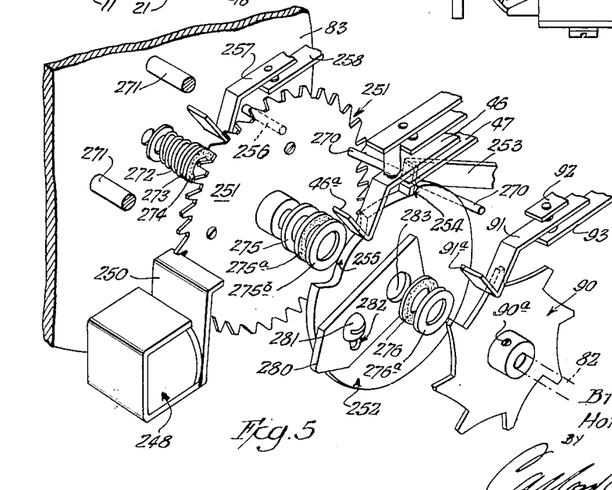
Fig. 5 is a fragmentary exploded perspective of the pulse rate indicator and timer unit showing especially the clutch disc, the master cam switch, and star timer cam switch.

Relay P sets up a circuit through reset cam switch contact 152—154 via conductor 174 through contacts 245—246 on relay P and thence via conductor 247 to a clutch release coil 248, which is thereby energized from battery 249 connected to common ground wire 120, in consequence of which a clutch disc holding pawl 250 is withdrawn from holding engagement in the teeth of a clutch disc 251 mounted on timer shaft 82 and driven thereby through a slip clutch mechanism now described in the views of Figs. 4 and 5.

Dial 83 is secured to the clutch disc by spacing posts 271. Interposed between the dial and the disc on shaft 82 is a spring 272 which bears against a cotter pin 82a in shaft 82 at one end (Fig. 4), and against a metal washer 273 and a felt washer 274 on the other end, which washers are thereby urged against the clutch disc. Both the dial and disc are free or floating on shaft 82.

Interposed between the opposite face of the clutch disc and master cam 252 is another set 275x (Fig. 4) of alternate metal and felt washers 275—275a—275b respectively (Fig. 5), while still a third set 276x (Fig. 4) of felt and metal washers 276—276a respectively (Fig. 5) is interposed between the master cam and the star cam 90, which is fast on the shaft 82 by means of its set screw 90a.

The operative assembly of the foregoing parts is shown in Fig. 4, while their functional or relative disposition is shown in Fig. 5. Thus, spring 272 urges the assembly of discs and washers against the constantly rotating star cam for rotation therewith through the frictional resistance of the washers, but if the clutch disc 251 or master cam 252 are restrained sufficiently to overcome the frictional drive afforded by the spring and washer slip-clutch arrangement, the shaft 82 and star cam may nevertheless continue to rotate.

Therefore, while pulse rate dial 83 and clutch disc 251 are fixed for joint rotation, the fact that clutch disc 251 is impositively driven from shaft 82 through said slip-clutch, makes it possible for pawl 250 normally to restrain rotation of the disc and dial although shaft 82 is driven constantly while the machine is in use. The master cam 252, driven impositively with clutch disc 251, may be restrained by the brake pawl 253 normally riding on the rim of the master cam and engaged by the shoulder 254 of a shallow notch or relieved portion 255 on the cam.

Thus, clutch disc 251 may rotate, while master cam 252 may be restrained or vice versa, but if the clutch disc is permitted to rotate long enough, (as when the machine is first started upon a cycle of operation) a pin 256 thereon will transiently engage a spring contact 257 and spring it out of normally closed-circuit engagement with a companion contact 258, thereby opening a circuit from ground 259 via conductor 260 through normal contacts 262—246 on relay P, thence via conductor 247 to the clutch coil 248, so that such opening of the ground 259 prevents energizing the clutch release coil 248.

When the machine is first set into operation by a coin, clutch release coil 248 is energized from power 249 and normal contacts 246—262 on relay P, and the normally closed dial-locating contacts 257—258, because relay B provides ground for battery 249.

As the clutch disc rotates from whatever position it happens to have been left in during a previous operation of the machine, an index or pointer 264 on the dial 83 moves approximately into zero or starting position relative to a zero or other starting point 265 just as pin 256 opens locating switch contacts 257—258, thereby to deenergize clutch coil 248 so that pawl 250 stops the clutch disc, and hence the pulse rate dial, at or closely near zero position. This occurs at the start of the cycle of operation.

When relay P pulls up for the pulse counting operation, the first few closures of reset cam switch contacts 152—154, responsive to detected pulses, causes energization of the clutch release coil 248 via conductor 174 through contacts 245—246 on relay P, conductor 247 to coil 248.

At the moment the foregoing operating circuit for clutch coil 248 is supplied by relay P as aforesaid, a pin 270 on the clutch disc transiently engages and rocks brake pawl 253 to free the master cam 252 for rotation in step with the dial 83 from zero position.

Each complete pulse detected (consisting of a systolic and attendant diastolic impulse) will cause energization of the clutch coil 248 via closed contacts 152—154, conductor 174, contacts 245—246 of relay P, and wire 247, coil 248, power 249 to common ground wire 120, connections 158, 157, wire 156, switch 66—65, wire 155 to reset contacts 152, 154, as aforesaid, for the time required by reset cam 34 to close and open the circuits through contacts 153—154, the rotation of the reset cam by motor 32 being held within limits, and upon each release of clutch disc holding pawl 250, the disc and dial may move a substantial amount by timed rotation of drive shaft 82, which will spread the average readings conveniently over the dial scale, since the pulses are counted for only a fraction of a minute, namely, twenty seconds, whereas the pulse rate scale (not illustrated herein but see our Patent 2,249,370 for one example of such a scale) is calibrated in terms of pulses per full minute.

The twenty-second pulse rate test is timed by a stop projection 280 on the master cam, adjustably mounted (Fig. 5) by means of a set screw 281 working in a concentric arcuate seat 282 in the stop, which has a hole 283 fitting loosely on shaft 82.

It will be recalled that this master cam is freed to move the instant the dial index is brought into starting or zero position. In the predetermined testing time, twenty seconds, the stop projection 280 is brought around beneath, and transiently engages the offset portion 46a of contact 46 and separates the latter from normally closed circuit engagement with contact 47, thereby breaking the power circuit from battery 49a, ground 49, for relay B. Contacts 46—47 immediately close again, since the stop projection is carried there-beyond into its starting position as shown in Figs. 1 and 5, where it is held by action of brake pawl 253 in arresting the master cam.

Release of relay B as aforesaid breaks the main ground connections 50—51—52 and 56—57—58 stopping all motors and releasing all other held relays, which results in a shutting off of the machine, an incident of which is the opening of escape valve 63—64 to relieve pressure in the tourniquet.

The readings on the pulse rate dial and both manometers remain until the next operation of the machine.

Summary of operation

The patron places his wrist beneath the tourniquet strap 13 in rest 10 with the hand cupped on form 12, then pulls tongue 14 taut, jaw means 17 holding the tongue against loosening. A coin, preferably, is used to close starting switch 40, whereupon escape valve 63—64 closes, and the pump and timer motors 32 and 80 start.

The pumps 30 build up air pressure which inflates the tourniquet bulb or cushion 20 against the patron's wrist, but as soon as a certain minimum sub-diastolic pressure, say equal to 45 millimeters of mercury, is reached, bellows valve 26 shuts off the tourniquet from the reservoir and closes safety switch 65—66 to connect the cam reset switch for service.

When the start or coin-switch is operated, relay B pulls up and holds; also, the clutch release coil 248 is energized through normal contacts 246—262 on relay P, so that the dial is free to rotate toward zero position 265, in which position pin 256 on the clutch disc opens locating switch 257—258 to break the aforesaid circuit to the clutch release coil and stop the dial and disc approximately at zero position 265.

Meanwhile, measuring valves H and I open and close alternately under control of timer switch contacts 91—92—93 through normal contacts 96—97 and 111—112 on relay A, thus gradually and intermittently increasing the pressure in the tourniquet through branch 71.

Ultimately, sufficient artificial pressure will be thus applied by the tourniquet to the artery under test to equal the diastolic arterial pressure, in consequent of which the arterial pulses accompanying each systole and diastole of the cardiac cycle, will increase and decrease the pressure in the tourniquet in correspondence to the same pressure variations in the artery, and therefore the detector switch bellows 130 through rod 131 will move detector switch contact 132 back and forth to alternately engage the systolic contact S or 133 or the diastolic contact D or 134, thus first energizing the systolic relay S, which locks a holding circuit for itself at contacts 160—161.

The systolic relay also sets up an operating circuit from the detector switch at contacts 163—164. A diastolic pulse following the aforesaid systolic pulse will energize the diastolic relay D via conductor 165 and contacts 163—164 on relay S, and the diastolic relay will also lock its own circuit at contacts 167—168, and, in addition, will energize the release coil 35 for the cam reset switch via contacts 169—170 battery 171, conductor 172.

Energization of the reset release coil withdraws holding pawl 35a so that cam 34 is free to be rotated by shaft 33, to which the cam is drivingly conected through a slip-clutch drive not seen but identical in principle to the washer arrangement 275—275a—275b in Fig. 5 herein, a spring washer being substituted for spring 272.

Rotation of the reset cam opens contacts 152—153 on the reset switch, breaking the circuit to power source 151 for both the systolic and diastolic relays S and D and thereby resetting the same.

Rotation of the reset cam by detection of a complete pulse as aforesaid, also actuates a testing means by closing cam reset contacts 152—154 to energize the step-up coil 182 of the commutator switch via conductor 174, wiper 176 and first contact 177 on bank #2, causing advancing pawl 184 to step ratchet 185 once and rotate shaft 186 to dispose all wipers at second position.

A second complete pulse would cause a repetition of the foregoing process, except that the step-up coil would be energized through second-position contact 178, bank #2, and control of the step-up coil would be transferred to the timing switch contacts 91—93 via conductor 108 to wiper 196 on bank #3.

In the meantime, manometer valve J has remained open as the pressure rises to the diastolic level (through normal contacts 122—123, relay A).

Following the first two detached and complete pulses, is a lapsed-time interval during which at least one, and preferably two complete systolic and attendant diastolic pulses may occur, as determined by the regulated speed of rotation of the star cam 90, which is arranged to cause two closures of contacts 91—93 in this interval to step the commutator once via wiper 196 at third position, or contact 195. The commutator switch now rests at fourth position, and control thereof reverts to the sensitive relays S and D and reset cam switch.

If now two additional and complete pulses are detected to actuate relays S and D, the commutator switch will step to sixth position and relay A will be energized via wiper 102 and last contact 201, on bank #1 through normal contacts 203—204 on relay A.

After the first two successive pulses are detected, diastolic manometer valve J is closed and measuring valves H and I are temporarily disabled because wiper 102 on bank #1 leaves contacts 101, disconecting power from conductor 100.

If, however, no further pulses are detected (e. g. either the fourth or fifth actual and complete pulses) following the lapsed-time interval, the commutator switch will be reset via wiper 196 and either of the last two contacts 191 or 193 on bank #3, energizing reset coil 182 from conductor 108 and timer switch contacts 91—93, whereupon a further pressure increase would occur by the next alternate operation of measuring valves H and I, and the aforesaid testing process would be repeated until the commutator switch moves to last position to energize relay A through wiper 102, on contact 201, as aforesaid.

The test for the systolic pressure goes forward as soon as relay A pulls up, for then the coils controlling valves H and I hold said valves open via contacts 97—210 and 112—205, respectively, on relay A, thus allowing the pressure to rise to a maximum in the tourniquet.

Meanwhile, valve J of the diastolic manometer will have finally closed to hold its reading, owing to interruption of the operation circuit for its coil 73 at contacts 122—123 on relay A. But valve K for the systolic manometer opens when relay A pulls up by closure of contacts 123 and 222 on relay A.

As the pressure rises in the tourniquet to the occluding value, high pressure switch contacts 143—144 are closed by the detector bellows, and the sensitive detector switch readjusts itself. Closure of the high-pressure contacts energizes relay C via conductors 120—217.

Energization of relay C breaks the hold-open circuit for the solenoid of valve H at contacts 211—212 on relay C.

Relay C also resets commutator switch by energizing reset coil 189 via last contact 191, bank #3, wiper 196, juncture 109 through contacts 207—225 on relay C, and contacts 91—93 upon closure by the star cam, whereby to dispose the switch in readiness to test for pulses at the systolic level.

The occluding pressure will now be dropped step by step by opening and closing of valve I via contacts 112—205 on relay A, conductor 206, contacts 207—225 on relay C, conductor 108 to timing switch contacts 91—93, in alternation with bleeder valve L via conductor 231, contacts 232—233 on relay C and conductor 95 to timing contacts 91—92.

Reduction of the occluding pressure will continue until a succession of true systolic and diastolic pulses causes the commutator switch to be advanced to last position in testing for pulses as heretofore described in conjunction with the ascertainment of the diastolic pressure—that is, there must be two complete and successive pulses (if not successive the timer switch will reset the commutator in the interim), which are followed by a measured lapsed-time interval sufficient for a predetermined number of pulses to occur, the arrangement shown permitting by preference two such complete pulsations, whereupon there must follow two more complete pulses to step the commutator to last position, with the result that manometer valve K will remain closed and pulse rate-relay P will be energized via wiper 102 and last contact 201 on bank #1.

The first pulses to be counted cause energization of clutch coil 248 via reset cam contacts 152—154, conductor 174 through contacts 245—246, on relay P, conductor 247 to the coil, battery 249, ground wire 120, connections 158, 157, wire 156, switch contacts 66, 65, wire 155, reset contacts 152, 154, as aforesaid which frees the disc and dial for intermittent steps corresponding to the pulses.

Just as dial index 264 approaches zero position 265, pin 270 raises brake pawl 253 to free the master cam, which therefore starts in step with the dial.

Pulses continue to cause energization of the clutch release coil (via 152—154—174—245—246—247) the coil 248, battery 249 to common ground wire 120 until the predetermined testing period of twenty seconds has elapsed, at which time the master cam will have rotated to move its stop projection 280 around beneath contact 46a to separate it momentarily from contact 47, thereby breaking the power circuit to ground 49 for relay B, which thereupon releases, and all circuits are restored to normal pending repeated operation of the machine.

It is to be understood that the designation herein of the power source by use of the conventional electrical symbol for a battery, and the conventional ground symbol to indicate a common conductor, is not intended as a limitation, but is used merely for convenience to provide a minimum number of conductors for purposes of simplification. Any suitable power source and mode of connection thereof may be used.

The foregoing description and illustrations are submitted as merely exemplarly of one preferred arrangement and form of the invention, and means for effectuating the objects set forth; but it is expressly to be understood that no particular mode of connection or inter-connection of the various circuits is intended, except insofar as the appended claims may be specific thereto, it being understood further that modifications in such connections and in the form and mode of operation of the instrumentalities named, may be made without departing from the scope of the invention, and no limitations are intended except as specifically contemplated by the following claims.

We claim:

1. Apparatus of the class described comprising, in cooperative combination, means for applying a pressure upon an artery, means for increasing said pressure from a sub-diastolic to the diastolic level of an artery under test, means coacting with said applying means for detecting arterial pulses in said artery, means controlled by said detecting means to arrest pressure increase as aforesaid by detection of a certain number of pulses, means for manifesting the applied pressure following arrest as aforesaid, as a measure of the diastolic pressure, means for thereupon automatically increasing said pressure to an occluding level, means for reducing said pressure automatically from occluding level in measured decrements until a certain number of pulses are detected by the detecting means, and means for manifesting the applied pressure, upon cessation of reduction as aforesaid, as a measure of the systolic pressure, and means for coordinating operation of the aforesaid means whereby to procure automatic operation thereof for the purposes and in the order named.

2. Apparatus as defined in claim 1, further characterized by the provision of means controlled by said detecting means for counting the number of arterial pulses in a given period following manifestation of the systolic pressure as aforesaid, and means for setting said pulse counting means into operation under control of the detecting means upon detection of the last of said certain number of pulses.

3. Apparatus of the class described comprising, in combination, a body applicator for applying fluid pressure upon an artery, a source of fluid pressure for said applicator, means for increasing said pressure from a sub-diastolic to a diastolic value in an artery under test, detecting means responsive to pressure variations in said applicator, occasioned by arterial pulses at the diastolic level, means for arresting pressure increase as aforesaid when a certain number of said pressure variations have occurred; means for manifesting the pressure in said applicator as a measure of the diastolic pressure following arrest as aforesaid, means for thereafter increasing pressure in said applicator to an occluding value, means for reducing said pressure from said occluding value step-by-step until a certain number of pulses are detected at a point close to the pressure of occlusion, and means for manifesting the pressure in said applicator at a time following detection of said last-mentioned number of pulses.

4. Apparatus of the class described comprising the following combination of cooperating instrumentalities: a tourniquet applicable at the wrist and inflatable by fluid pressure, means for inflating said tourniquet to a pressure where diastolic arterial pulses are manifested by corresponding pressure variations in the tourniquet, means operated by occurrence of a certain number of said variations in the tourniquet pressure, for temporarily preventing change of the tourniquet pressure by the inflating means, means for manifesting the pressure in the tourniquet, at or following the last of said number of variations, as a measure of the diastolic pressure, means for maintaining the reading of said manifesting means during a subsequent period, means for increasing the pressure in the tourniquet until no effective variations due to arterial pulses are manifested in said tourniquet, means for reducing said pressure until effective variations are again manifested by variations in the tourniquet pressure, and means actuated following occurrence of another predetermined number of said last-mentioned variations for preventing further reduction in the tourniquet pressure, together with means for manifesting the pressure in the tourniquet as a measure of the systolic pressure following operation of the preventing means as last-mentioned.

5. In an apparatus as defined in claim 4, the further provision of means registering said pressure variations in the tourniquet at the level of diastolic pressure, and means for manifesting registered variations as pulses in terms of a rate per unit of time.

6. In a device of the class described including means for applying a testing pressure to an artery, and means controlled by said applying means for detecting arterial pulses, apparatus and means actuating the same automatically in testing cycles for ascertaining both diastolic and systolic arterial tension, said apparatus including means for adjusting said applied pressure upwards to the diastolic level to condition said detecting means for detection of diastolic pulses, means for manifesting the degree of applied pressure at a time when diastolic pulses are detected as aforesaid, means for thereafter elevating the applied pressure until blood flow is stopped, means for thereafter reducing said elevated pressure by uniform decrements until blood flow can be resumed, and means for determining said resumption and cooperable with said detecting means to prevent further pressure reduction if a group of pulses are detected, together with means for manifesting the degree of applied pressure as the systolic pressure at the time of, or closely following, resumption of blood flow as aforesaid.

7. An apparatus for ascertaining diastolic and systolic blood pressure including: a single wrist strap and an inflatable bag conformed to be held thereby against the volar aspect of the wrist, to apply pressure upon an artery, means for inflating said bag by increments at timed intervals until diastolic arterial pulses effect reactionary pressure variations in said bag, means for exhibiting the degree of pressure in said bag during increments as aforesaid, means conditioned for operation by a group of said reactionary variations for preventing change in the exhibited degree of pressure, means for automatically increasing the applied pressure in said bag to occlude blood flow following operation of said conditioning means, means for thereafter automatically reducing said applied pressure until blood flow can be resumed to cause further reactionary variations in the bag at the systolic level, and means independent of first exhibiting means for exhibiting the applied pressure as a measure of the systolic pressure at least as of the time a group of said variations occurs following resumption of flow as aforesaid.

8. In apparatus of the class described, in combination, a pneumatic tourniquet for application of pressure to an artery, a pair of manometers, means connecting said manometers in a pressure system including said tourniquet, pressure-sensitive detecting means communicating with said system, means for increasing air pressure in said system by measured amounts toward an expected diastolic level at which diastolic arterial pulses will effect pressure variations in said system, means for closing off each of said manometers from said system, means controlled by said detecting means responsive to detection of a group of test pressure variations in the system at the diastolic level for actuating the closing-off means for one of said manometers thereby to indicate the diastolic pressure, means controlled by said detecting means following detection of said test group of pulsations for directly raising the applied tourniquet pressure to a degree above a certain expected average systolic level, means for thereupon effecting reductions in the raised pressure at uniformly spaced intervals, and means actuated under control of said detecting means following detection thereby of another group of test pulsations for closing off the other manometer whereby to hold its reading as a measure of the systolic pressure.

9. Apparatus, as defined in claim 8, further characterized by the provision of totalizing means for counting pulses, means controlled by said detecting means operable following detection of one of said groups of test pulses for effecting an advance of said totalizing means for each detected pulse, and means conditioning said totalizing means for operation for a determined period, whereby the total of pulses will be representative of the pulse rate.

10. Apparatus of the class described comprising, in combination, means for detecting arterial pulses in an artery under test, means for applying testing pressure to said artery, means for increasing said pressure from a sub-diastolic level, automatically in steps, until pulses are detected by said detecting means, means operable under control of said detecting means responsive to detection of a certain number of pulses to exhibit the degree of pressure applied as of the time of detection of the last of said number of pulses, means thereafter operable automatically to increase said pressure to an occluding value, means for reducing said pressure automatically until pulses are first again detected by said detecting means, and means for counting a certain number of said last-mentioned pulses and exhibiting the pressure existing as of the time of the counting of the last of said pulses.

11. Apparatus of the class described comprising, in combination, means for detecting arterial pulses in an artery under test, means for applying testing pressure to said artery, means for increasing said pressure from a sub-diastolic level, automatically in steps, until pulses are detected by said detecting means, means operable under control of said detecting means responsive to detection of a certain number of pulses to exhibit the degree of pressure applied as of the time of detection of the last of said number of pulses, means thereafter operable automatically to increase said pressure to an occluding value, means for reducing said pressure automatically until pulses are first again detected by said detecting means, means for counting a certain number of said last-mentioned pulses and exhibiting the pressure existing as of the time of the counting of the last of said pulses, and means under control of said detecting means and operable automatically following counting of said last-mentioned pulses for counting additional pulses occurring in a given period of time and exhibiting the said number of additional pulses in terms of a rate of pulses per unit of time.

12. In a blood pressure machine, means for applying a testing pressure to an artery, means for detecting pulses in said artery, means operable automatically in testing cycles for first raising the testing pressure to the diastolic level, counting a certain series of pulses, exhibiting the value of the pressure level at which said pulses were counted, thereafter increasing said pressure automatically to a value above a systolic level in said artery, reducing said pressure until further pulses are first detected, counting a second series of said pulses, then exhibiting the value of the applied pressure level at which said second series of pulses was counted.

13. In a blood pressure machine, means for applying a testing pressure to an artery, means for detecting pulses in said artery, means operable automatically in testing cycles for first raising the testing pressure to the diastolic level, counting a certain series of pulses, exhibiting the value of the pressure level at which said pulses were counted, thereafter increasing said pressure automatically to a value above a systolic level in said artery, reducing said pressure until further pulses are first detected, counting a second series of said pulses, then exhibiting the value of the applied pressure level at which said second series of pulses was counted, and means operable automatically thereafter for counting a third series of pulses during a time interval and exhibiting the value of said counting operation.

14. In a blood pressure machine, in combination, means for applying fluid pressure to an artery, separate diastolic and systolic pressure gauges, means for automatically adjusting the applied pressure upwardly or downwardly in steps of predetermined volume, means for increasing the applied pressure to an occluding value in one step, electrical timing and control means arranged and constructed to correlate the operation of the foregoing instrumentalities to increase the pressure in a plurality of steps to the diastolic level and thereafter increase the pressure in one step to an occluding value above the systolic level, and thereafter reduce the pressure in steps to the systolic value, and to cause said pressures to be exhibited respectively on said diastolic and systolic gauges.

15. In a blood pressure machine, means for applying fluid pressure to an artery under test, and for increasing said pressure from sub-diastolic levels to above a systolic level by timed and volumetrically predetermined increments, means for reducing said pressure by timed and volumetrically predetermined decrements, separate diastolic and systolic gauges, step-operating pulse counting means, timing means, and control means coordinating the operation of the aforesaid instrumentalities to increase the pressure to the diastolic level of an artery under test, then to an occluding level above systolic, then decrease said pressure to the systolic level, to manifest the value of diastolic and systolic pressures aforesaid, to verify pulses at both levels, by counting and timing pulses in said artery at both diastolic and systolic levels, and to count the number of true pulses, each consisting of a systolic and attendant diastolic pulse, occurring in a timed interval, and to exhibit said count.

16. In a blood pressure machine the combination with means for detecting diastolic and systolic pulse effects, of control mechanism including a relay controlled by diastolic pulses and a relay controlled by systolic pulses, connections for setting up a locking circuit for each said relay upon actuation thereof, a cam reset switch actuated by one of said relays for breaking said locking circuit for both relays following successive actuation thereof, and blood pressure ascertaining means operably controlled by a certain number of operations of said cam reset switch.

17. In a blood pressure machine of the type including a pulse detector switch actuated by diastolic and systolic pulse effects, control means comprising: a diastolic relay and a systolic relay connected to be actuated by said switch, one of said relays setting up an operating circuit for the other, and connections established by both relays for locking the respective operating circuits thereof following each actuation by said detector switch, together with rotary cam reset switch means operably controlled by one of said relays for breaking said locking circuits, and means actuated by a predetermined number of operations of said reset switch means to effectuate certain operations of said machine.

18. In apparatus of the class described including mechanism for ascertaining cardiometric data, control means comprising: detector switch means actuated by diastolic and systolic pulses, relay means actuated by diastolic pulses, under control of said detector switch means, relay means actuated by systolic pulses under control of said detector switch means, one of said relay means being connected so as to be operable as aforesaid only if the other said relay means is operated, means for electrically locking each relay means separately in operated condition, upon actuation as aforesaid, and cyclically operable reset switch means actuated for a cycle of operation by one of said relay means for causing release of both relay means from electrically locked condition, and testing means actuated by said reset switch in certain cycles of operation thereof.

19. In a blood pressure machine, control means comprising, a diastolic relay, a systolic relay, a pulse-actuated switch, a reset switch, cam means for actuating said reset switch, electrically controlled release means normally restraining said cam means from rotation, motor means normally tending to rotate said cam means, and circuit connections for the foregoing instrumentalities so arranged that one of said relays is actuated by said pulse switch and said relay connects a holding circuit for itself, cooperably with said reset switch, and also a circuit for actuation of the other relay by said pulse switch, said other relay connecting its own holding circuit cooperably with said reset switch when actuated as aforesaid, and means controlled by said other relay for releasing said cam restraining means to actuate said reset switch and disconnect said holding circuit.

20. In a blood pressure apparatus, control means comprising: a diastolic circuit switch, a systolic circuit switch, pulse sensitive means for actuating said switches respectively in response to diastolic and systolic pulses in an artery in which the blood pressure is being ascertained, a first circuit control means actuated by one of said switches, a second circuit control means actuated by the other said switch, a holding circuit set up for said first and second control means upon actuation as aforesaid, a holding circuit switch normally operable to maintain said holding circuit in operative condition when set up, cam means rotatable a certain amount from a starting position to operate said holding switch and open said holding circuit, motor means normally tending to rotate said cam means, releasable means normally restraining said cam means from rotation, and means actuated by at least one of said first or second circuit control means for effecting release of said releasable means to free said cam for rotation a certain amount to actuate the holding switch means as aforesaid and thereafter arrest the cam means following rotation of the same the certain amount aforesaid, said cam means being adapted to actuate an instrumentality in said apparatus when released as aforesaid.

21. In apparatus of the class descibed, in combination, a detector switch adapted to be actuated by diastolic and systolic arterial pulses, relay means controlled by said detector switch, a holding circuit set up by said relay means upon actuation of the detector switch as aforesaid, a cam reset switch operable in cycles to release said holding circuit once during each cycle of operation, electrical means actuated by said relay means to effect a cycle of operation of said cam reset switch to effect release of said holding circuit, as a result of each complete operation of the relay means responsive to systolic and attendant diastolic pulse operations of said detector switch, and control means actuated by said cam reset switch during each cycle of operation thereof.

22. In a blood pressure machine means for applying and varying fluid pressure to detect arterial pulses at the diastolic and systolic levels, detector switch means actuated by diastolic and systolic pulse reactions detected as aforesaid, a timer switch, diastolic and systolic relays actuated by said detector switch means, a holding circuit set up by successive operation of said relays, reset switch means actuated as a result of the aforesaid successive operation of said relays to break said holding circuit, and a stepping type switch advanced partly under control of said reset switch upon each circuit breaking action thereof as aforesaid, and partly under control of said timer switch dependent upon the number of successive advances made by said stepping switch in a given period of time, and means for manifesting the degree of pressure, applied as aforesaid following a certain number of advances of said stepping switch, together with means for automatically resetting said stepping switch if the same fails to take said given number of steps, and also following the taking of said number of steps.

23. In a blood pressure machine, a detector switch actuated by systolic and diastolic pulses, systolic and diastolic relays, a motor driven reset switch electrically releasable for operation in cycles, a timer switch, an electrically actuated commutator switch, and circuit connections whereby said relays are operated in succession by systolic and corresponding diastolic operations of said detector switch and are held operated by a locking circuit subsequently opened by said reset switch responsive to release of said releasable means under control of at least one of said relays when operated in said locking circuit, and connections for causing operation of said commutator switch means in an alternate manner under control of said reset switch and said timer switch dependently upon a predetermined order and number of operations of said relays, and circuit connections controlled by said commutator switch dependently up a certain number of operations thereof under control of the reset and timer switch means aforesaid.

24. In a blood pressure machine, means for sensing arterial pulses, a relay actuated by said sensing means responsive to the sensing thereby of a pulse attending a systole, a relay actuated by said sensing means responsive to the sensing thereby of a pulse attending a diastole, a locking circuit closed by each said relay upon actuation as aforesaid, reset switch means controlled by one of said relays for breaking the holding circuit for both relays, and a circuit commutating switch actuated in certain positions by said reset switch upon resetting operation thereof to break the holding circuit, whereby to establish a different operative circuit for the commutating switch, and a second means for actuating said commutating switch by said different operating circuit, whereby to advance the commutating switch to a predetermined position and reestablish a control circuit therefor to said reset switch for further advance of the commutating switch, circuit connections instrumental in ascertainment of blood pressure by said machine being established by said further advance, and means for restoring said commutating switch to a starting position under control of said second actuating means therefor, provided the same is not advanced by said reset switch at certain times when it is connected to operate the commutating switch as aforesaid.

25. In a blood pressure machine in combination, a commutator switch for setting up various control circuits employed in said machine, relay means controlled by arterial pulses, a holding circuit for said relay means and established by a predetermined operation of said relay means, an intermittently operable reset switch releasable to open said holding circuit, means for advancing or resetting said commutator switch, an intermittently operable timer switch timed to operate at intervals between which a predetermined number of arterial pulses may occur, and circuit connections for the foregoing instrumentalities so arranged that said commutator will be advanced or reset under control of said reset switch and said timer switch dependently up the number, sequence, and timing of operations of said relay means by arterial pulses, as aforesaid, said commutator switch being connected to establish certain of said control circuits when advanced to certain portions as aforesaid.

26. The combination defined in claim 25 and further characterized by the inclusion of pressure ascertaining and manifesting means, pulse counting means, circuit connections, and relay means controlled by said commutator switch for cycling the operation of said machine and causing the latter to operate in three testing phases, during one of which the diastolic pressure is ascertained and manifested, and during a second of which the systolic pressure is ascertained and manifested, and during a third phase of which the number of pulses occurring in a given time period is counted and manifested as a rate measure, together with means for initiating cyclic operation of said machine.

27. In a blood pressure machine of the type adapted to apply pressure to an artery for testing purposes, an arm rest for applying said pressure and comprising a member having a trough portion shaped to receive the wrist with an adjoining raised portion having conformations adapted to receive and individually seat the fingers of the hand adjoining said wrist, pressure applying means in said trough for engagement with portions of said wrist, and strap means for securing said wrist in position in the trough for engagement with said pressure applying means.

28. A body-engaging device for testing purposes of clinical nature, said device comprising a member having a mound-like portion with depressions arranged to receive the fingers of a hand in partially closed condition, said member having a portion adjoining said mound to receive the wrist, at least, of said hand, testing means in said wrist-receiving portion, and means for releasably holding a wrist member in said wrist-receiving portion.

29. A body-member rest for use in tests of clinical nature, said rest comprising an elevated member having configurations to receive separately the appendages of a hand, including the wrist portion thereof, expansible testing means in the part of said device which receives said wrist, and means including a movable element and releasable lever mechanism cooperable therewith such that said movable element may be moved in one direction to confine a wrist member in said part receiving the same, but is automatically restrained against movement in an opposite direction responsive to effort of said wrist portion to move outwardly of said receiving part as a result of expansion of said expansible means, said lever mechanism being operable to free said movable element for movement in said opposite direction to permit withdrawal of said wrist portion.

BRADLEE W. WILLIAMS.
HOMER S. WILLIAMS.